(12) United States Patent
Somei (10) Patent No.: US 9,031,609 B2
(45) Date of Patent: May 12, 2015

(54) MOBILE COMMUNICATION DEVICE

(75) Inventor: Yasunobu Somei, Yokohama (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 13/638,135

(22) PCT Filed: Mar. 29, 2011

(86) PCT No.: PCT/JP2011/057890
§ 371 (c)(1),
(2), (4) Date: Sep. 28, 2012

(87) PCT Pub. No.: WO2011/122642
PCT Pub. Date: Oct. 6, 2011

(65) Prior Publication Data
US 2013/0023306 A1 Jan. 24, 2013

(30) Foreign Application Priority Data
Mar. 29, 2010 (JP) .................................. 2010-076292

(51) Int. Cl.
H04M 1/725 (2006.01)
G08B 13/196 (2006.01)
H04M 1/02 (2006.01)

(52) U.S. Cl.
CPC ....... *H04M 1/72555* (2013.01); *G08B 13/1961* (2013.01); *H04M 1/72597* (2013.01); *H04M 2250/52* (2013.01); *H04M 1/0214* (2013.01)

(58) Field of Classification Search
CPC ..................... H04M 1/72555; H04M 1/72597; H04M 1/0214; H04M 2250/52; G08B 13/1961; G08B 13/19656

USPC .......................... 455/456; 340/539.22, 870.01
See application file for complete search history.

(56) References Cited

U.S. PATENT DOCUMENTS

| | | | |
|---|---|---|---|
| 2006/0145841 A1* | 7/2006 | Daurensan et al. | 340/539.22 |
| 2010/0020353 A1* | 1/2010 | Yamaguchi | 358/1.15 |
| 2010/0159967 A1* | 6/2010 | Pounds et al. | 455/466 |
| 2011/0179272 A1* | 7/2011 | Klos et al. | 713/168 |

FOREIGN PATENT DOCUMENTS

| | | |
|---|---|---|
| JP | 7222249 A | 8/1995 |
| JP | 9152475 A | 6/1997 |
| JP | 2004056223 A | 2/2004 |
| JP | 2004355539 A | 12/2004 |
| JP | 2005027135 A | 1/2005 |
| JP | 2005241715 A | 9/2005 |
| JP | 2006146475 A | 6/2006 |
| JP | 2006165610 A | 6/2006 |
| JP | 2008153730 A | 7/2008 |
| JP | 2008205771 A | 9/2008 |
| JP | 2009211659 A | 9/2009 |
| WO | 2007108141 A1 | 9/2007 |

* cited by examiner

*Primary Examiner* — Nizar Sivji
(74) *Attorney, Agent, or Firm* — Lowe Hauptman & Ham LLP (57) ABSTRACT

According to an aspect, a mobile communication device includes: an operating unit for receiving an operation; an imaging unit for taking an image; a communication unit for communicating with another communication device; and a control unit configured to start taking an image by the imaging unit upon starting communication with a set first communication device through the communication unit, and transmit the image to the first communication device through the communication unit.

11 Claims, 7 Drawing Sheets

MOBILE COMMUNICATION DEVICE

CROSS-REFERENCE TO RELATED APPLICATION

This application is a National Stage of PCT international application Ser. No. PCT/JP2011/057890 filed on Mar. 29, 2011 which designates the United States, and which is based upon and claims the benefit of priority from Japanese Patent Application No. 2010-076292, filed on Mar. 29, 2010.

FIELD

The present disclosure relates to a mobile communication device that has a communication function and an imaging function.

BACKGROUND

Some mobile communication devices such as a mobile phone and a PHS (Personal Handy-phone System) include various functions in addition to a communication function. For example, Patent Literature 1 discloses a portable image transmitter. The portable image transmitter includes a main body that integrates an image input unit such as a camera, a transmission unit, a display unit, and an operating unit. The transmission unit digitalizes and compresses an output video signal from the image input unit so as to generate an output signal to a public line. The transmission unit also receives a signal from the public line, and then demodulates and decodes the signal. The display unit displays the decoded the video signal. The operating unit operates the respective devices. The portable image transmitter further uses a detachable mobile phone so as to establish connection with the public line.

CITATION LIST

Patent Literature

Patent Literature 1: JP-A-07-222249

Technical Problem

As described in Patent Literature 1, providing an imaging function with the mobile communication device allows one device to both transmit an image and make a phone call. Incidentally, some mobile communication devices include a GPS function for purposes of preventing users from getting lost, a crime prevention function, and the like. While the GPS function specifies a region in a certain range, the GPS function has a limitation in the range to be specified. Moreover, an inexperienced operator has difficulty in using the GPS function to notify a specific person of his own location. The GPS function is a function that receives a radio wave from a plurality of GPS satellites to obtain latitude, longitude, and altitude of the mobile communication device.

For the foregoing reasons, there is a need for a mobile communication device that simply and easily notifies another party of a location or surroundings of the mobile communication device.

SUMMARY

According to an aspect, a mobile communication device includes: an operating unit for receiving an operation; an imaging unit for taking an image of an object; a communication unit for communicating with another communication device; and a control unit for starting to take an image with the imaging unit and transmitting image information acquired by the imaging unit to the other communication device that has started the communication, in a case where the control unit starts the communication with the other communication device that is set to be targeted for transmission of the image taken by the imaging unit. The control unit has a first mode in which the image information acquired by the imaging unit is transmitted and a second mode in which the image information acquired by the imaging unit is processed to be transmitted.

According to another, the control unit is configured to add additional information corresponding to the image information in the second mode.

According to another aspect, the mobile communication device further includes a location information acquiring unit for acquiring location information of the mobile communication device. The additional information is the location information acquired by the location information acquiring unit.

According to another aspect, the mobile communication device further includes an orientation information acquiring unit for acquiring orientation information related to the image information. The additional information is the orientation information related to the image information.

According to another aspect, the control unit is configured to acquire the additional information through the communication unit in the second mode.

According to another aspect, in the second mode, the control unit is configured to transmit the image information to a processing device for processing the image information, and transmit the processed image information to the other communication device through the processing device.

According to another aspect, the control unit is configured to start transmitting the image information in a case where the control unit receives a communication start request from another communication device that is set to be targeted for transmission of a taken image taken by the imaging unit and then communication with the other communication device is started.

According to another aspect, the mobile communication device further includes a location detection unit for detecting a location of the mobile communication device. The control unit is configured to stop at least one of taking the image by the imaging unit and transmitting the image information, in a case where the location of the mobile communication device detected by the location detection unit is within a set region.

According to another aspect, the control unit includes a time measurement unit for detecting an elapsed time after a reference time, and is configured to stop at least one of taking the image by the imaging unit and transmitting the image information, in a case where the elapsed time exceeds a predetermined time.

According to another aspect, the mobile communication device further includes a receiver unit. The imaging unit is disposed on an opposite face of a face on which the receiver unit is disposed.

According to another aspect, the control unit is configured to stop taking the image by the imaging unit and transmitting the image information, in a case where the control unit detects a preliminarily set sound signal in sound signals supplied from the other communication device during a phone call.

According to another aspect, the control unit is configured to transmit the image information acquired by the imaging unit to a communication device including a function for detecting location information from the image.

Advantageous Effects of Invention

The mobile communication device according to one of the embodiments of the present invention allows the other party to understand surroundings of the mobile communication device using an image, so that the other party is simply and easily notified of the location or surroundings of the mobile communication device, as advantageous effects.

DESCRIPTION OF EMBODIMENTS

The embodiments of the present invention will be described in detail below by referring to the accompanying drawings. The present invention is not limited by the following description. The constituent elements described below include various modifications that will readily occur to those skilled in the art, modifications substantially identical thereto, or what is called equivalent range thereof. The following description employs a mobile phone as an exemplary mobile communication device. However, objects to which the present invention is applied are not limited to the mobile phones. The mobile communication device of the present invention may be applied to, for example, PHSs (Personal Handy-phone Systems), etc.

Figure 1:
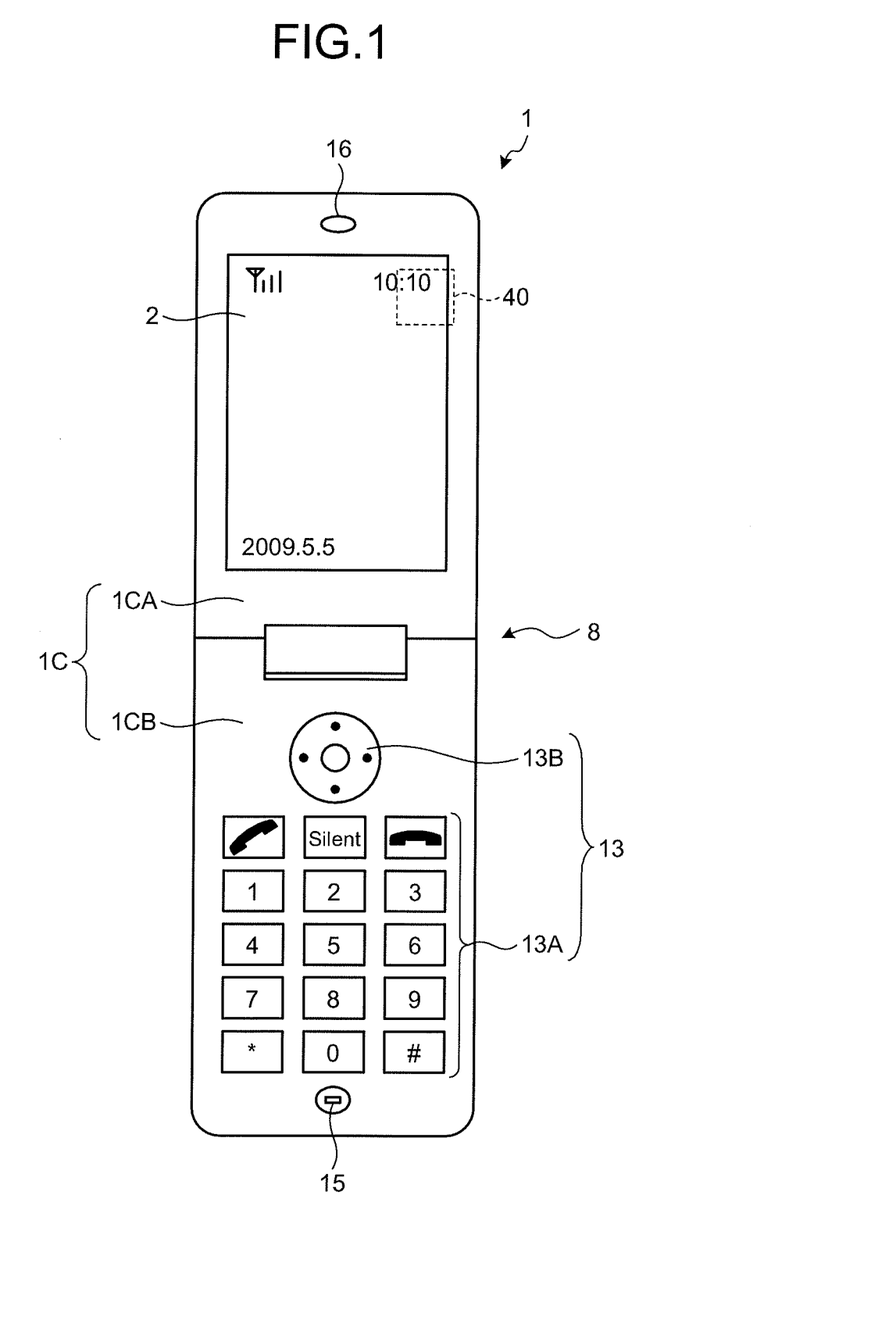
FIG. 1 is a front view illustrating a schematic configuration of an exemplary mobile communication device according to an embodiment.
Figure 2:
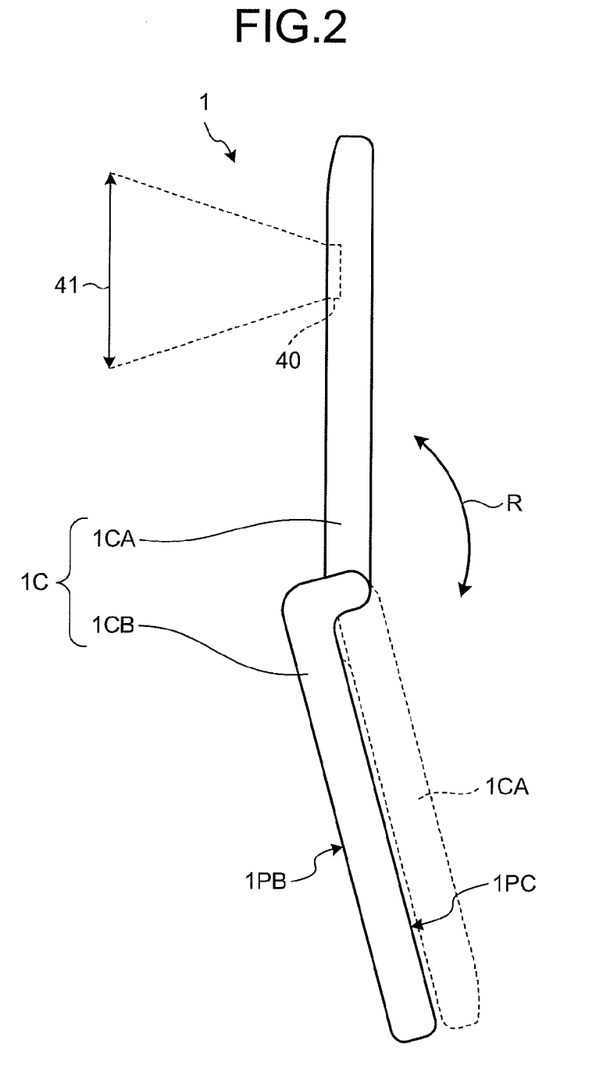
FIG. 2 is a side view of the mobile communication device in FIG. 1.

FIG. 1 is a front view illustrating a schematic configuration of an exemplary mobile communication device according to an embodiment. FIG. 2 is a side view of the mobile communication device in FIG. 1. A mobile communication device 1 illustrated in FIGS. 1 and 2 is a mobile phone that includes a wireless communication function, an output means, a voice receiving means, a visible light communication means, and an imaging means. The mobile communication device 1 has a housing 1C that includes a plurality of housings. Specifically, the housing 1C includes a first housing 1CA and a second housing 1CB, which are openable and closable. That is, the mobile communication device 1 includes a foldable housing. The housing of the mobile communication device 1 is not limited to this structure. The housing of the mobile communication device 1 may employ, for example, a slidable or rotatable housing. The slidable housing allows housings in mutually overlapping positions to slide in mutually opposite directions. The rotatable housing allows one housing to rotate on an axis line in an overlapping direction. The mobile communication device 1 may employ housings coupled by a two-axis hinge.

The first housing 1CA and the second housing 1CB are coupled with a hinge mechanism 8, which is a coupling unit. Coupling the first housing 1CA and the second housing 1CB together with the hinge mechanism 8 allows the first housing 1CA and the second housing 1CB to relatively rotate on the hinge mechanism 8 in a direction illustrated by an arrow R in FIG. 2. The first housing 1CA and the second housing 1CB rotate on the hinge mechanism 8 so as to move from a position illustrated by solid lines in FIG. 2 to a position, which is a folded position, illustrated by dotted lines in FIG. 2.

The first housing 1CA includes a display 2 illustrated in FIG. 1 as a display unit. The display 2 displays an idle screen when the mobile communication device 1 is waiting for reception. The display 2 displays a menu image to be used for assistance of the operations of the mobile communication device 1. The first housing 1CA includes a receiver 16 that is the output means that outputs voice when the mobile communication device 1 makes a phone call.

The mobile communication device 1 includes a camera 40 to take (acquire) an image. The camera 40 is disposed on an opposite end of the hinge mechanism 8 in the first housing 1CA, and disposed on an opposite face of a face on which the display 2 is disposed. The camera 40 includes an imaging window that is exposed outside of the first housing 1CA. The camera 40 obtains an image of an imaged area 41 illustrated by dotted lines and an arrow in FIG. 2. Thus, the camera 40 is disposed on the opposite side of a face on which the receiver 16 of the first housing 1CA is disposed.

The second housing 1CB includes a plurality of operation keys 13A and a navigation and selection keys 13B. The operation keys 13A allow inputting a telephone number of a called party and characters to compose an e-mail. The navigation and selection keys 13B allow, for example, navigating and selecting a menu displayed on the display 2, and scrolling a screen with ease. The operation key 13A and the navigation and selection keys 13B constitute an operating unit 13 of the mobile communication device 1. The second housing 1CB includes a microphone 15 that is the voice receiving means for receiving voice when the mobile communication device 1 makes a phone call. The operating unit 13 is disposed on an operating face 1PC of the second housing 1CB as illustrated in FIG. 2. An opposite side to the operating face 1PC is a back surface 1PB of the mobile communication device 1.

The second housing 1CB internally includes an antenna. The antenna is a transmitting and receiving antenna used for wireless communication. The antenna is used for transmitting and receiving a radio wave (an electromagnetic wave) for phone calls, e-mails, and the like between the mobile communication device 1 and a base station. The second housing 1CB includes the microphone 15 that is disposed on the operating face 1PC of the mobile communication device 1 as illustrated in FIG. 2.

Figure 3:
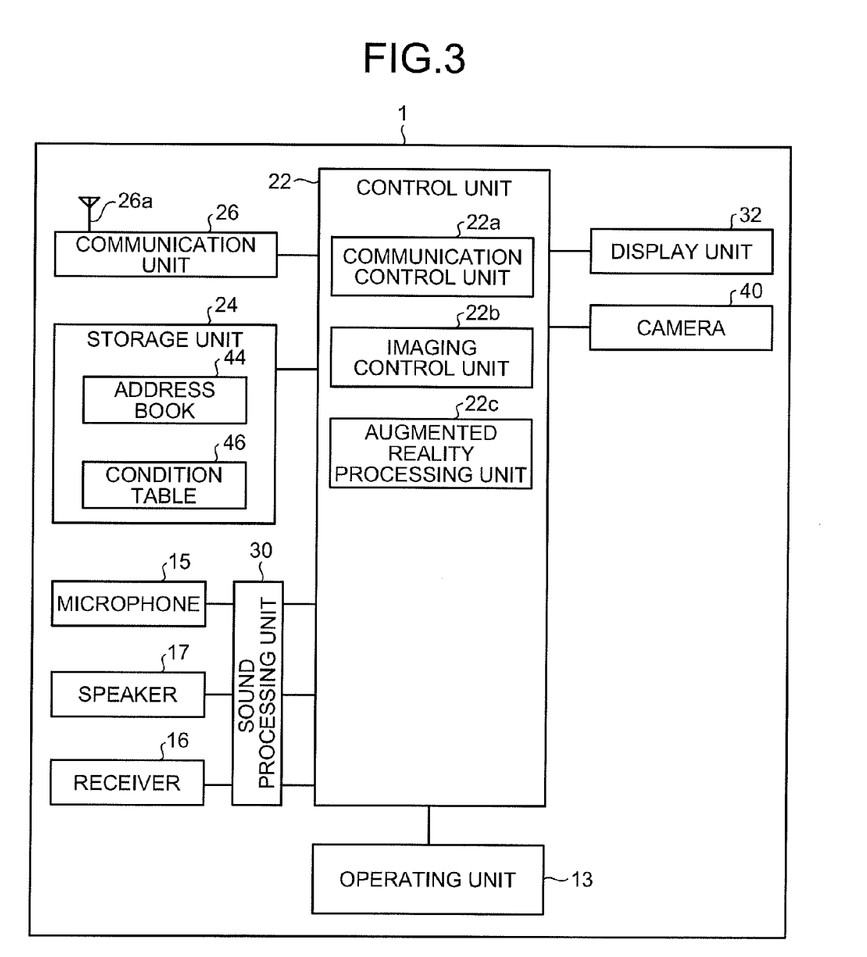
FIG. 3 is a block diagram illustrating a schematic functional configuration of the mobile communication device in FIGS. 1 and 2.

FIG. 3 is a block diagram illustrating a schematic functional configuration of the mobile communication device in FIGS. 1 and 2. As illustrated in FIG. 3, the mobile communication device 1 includes a control unit 22, a storage unit 24, a communication unit 26, the operating unit 13, a sound processing unit 30, a display unit 32, and the camera 40.

The control unit 22 has a function that integrally controls the whole operation of the mobile communication device 1. That is, the control unit 22 controls operations of the communication unit 26, the sound processing unit 30, the display unit 32, and the like. Thus, various processings of the mobile communication device 1 are executed in an appropriate procedure in accordance with operations through the operating unit 13 and software stored in the storage unit 24 of the mobile communication device 1.

The control unit 22 executes a processing based on programs (for example, an operating system program, an application program) stored in the storage unit 24. The control unit 22 includes, for example, an MPU (Micro Processing Unit), and executes various processings of the mobile communication device 1, which are described above, in accordance with a procedure indicated by the software. That is, the control unit 22 sequentially reads out operation codes from the operating system program, the application program and the like in the storage unit 24 and then executes a processing.

The control unit 22 in this embodiment includes a communication control unit 22a, an imaging control unit 22b, and an augmented reality processing unit 22c. The communication control unit 22a controls communication with another communication device through the communication unit 26. The imaging control unit 22b controls an imaging operation by the camera 40. The augmented reality processing unit 22c adds information to an image obtained by the camera 40. Respective functions of the communication control unit 22a and the imaging control unit 22b are achieved by hardware resources including the control unit 22 and the storage unit 24 that execute tasks assigned by the respective control units of the control unit 22. Here, a task is a unit of processings that is not able to be executed at the same time among processings executed by one application software unit or the whole processing executed by application software units.

The communication control unit 22a controls a phone call to/from another communication device through the communication unit 26 and a data communication with another communication device. Specifically, the communication control unit 22a executes processings such as detection of an incoming call, a calling operation, a transmission and a reception of data, a termination of a phone call, and a selection of communication information. The imaging control unit 22b controls the imaging operation of the camera 40. Specifically, the imaging control unit 22b executes processings such as activation, termination, image acquisition, selection of an imaging mode, and focal point adjustment of the camera 40. The augmented reality processing unit 22c selects information corresponding to an image based on the image obtained by the camera 40, and then adds the selected information to the image as additional information. The augmented reality processing unit 22c adds additional information in the case where an augmented reality mode is selected by a user. On the other hand, in the case where a reality mode is selected, the augmented reality processing unit 22c does not add additional information. The mode selection is set by a user through various setting operations.

The storage unit 24 stores software and data that are used for the processing in the control unit 22. The storage unit 24 stores a task that operates the application programs used in the communication control unit 22a and the imaging control unit 22b, and a task that operates various programs. The storage unit 24 stores various kinds of data in addition to these tasks. The storage unit 24 stores an address book 44 and a condition table 46 used in the communication control unit 22a. The address book 44 describes and manages a telephone number, an e-mail address, and the like of a communication destination. The storage unit 24 stores data in addition to these data such as voice data that is communicated and downloaded, a sound file such as dial tone and ringtone, and a temporal data used in a processing of software.

The address book 44 stores a plurality of pieces of address information (one piece of registered data) in which the name, the telephone number, the e-mail address, and the like are registered. The address information, which is input to and stored in the address book 44, may include various items such as group information for classifying the address information. The condition table 46 stores a condition to control a communication operation of the communication control unit 22a, especially, a telephone operation. The condition table 46 stores a condition to select a function to be activated depending on a called party when making a phone call.

The communication unit 26 includes an antenna 26a. The communication unit 26 establishes a wireless signal path using a CDMA (Code Division Multiple Access) system or the like between the communication unit 26 and a base station through a channel assigned by the base station. Then, the communication unit 26 performs telephone communication and information communication with the base station. The operating unit 13 includes the operation keys 13A and the navigation and selection keys 13B. The operation keys 13A include, for example, various functions assigned to a power key, a talk key, numeric keys, a character key, navigation keys, a selection key, a call key, and similar keys. A user's input operation by the operation key 13A and the navigation and selection keys 13B generates a signal corresponding to the detail of the operation. The generated signal is input to the control unit 22 as an instruction from the user.

The sound processing unit 30 executes a processing on a sound signal received at the microphone 15 and a sound signal output from the receiver 16 or the speaker 17.

The display unit 32 includes the display 2 as described above. The display unit 32 displays an image or a video, which corresponds to image data or video data supplied from the control unit 22, on a display panel. The display 2 includes a display panel made of, for example, an LCD (Liquid Crystal Display) and an OEL (Organic Electro-Luminescence) panel. The display unit 32 may include a sub-display in addition to the display 2.

As described above, the camera 40 is disposed on a face at the opposite side to the receiver 16 of the first housing 1CA. The camera 40 is an imaging system that obtains an image (an image of an object) of a certain imaged area 41 among regions facing (opposing) outer side (an opposite side of a face including the display 2) of the first housing 1CA. The mobile communication device 1 has a basic configuration as described above.

Figure 4:
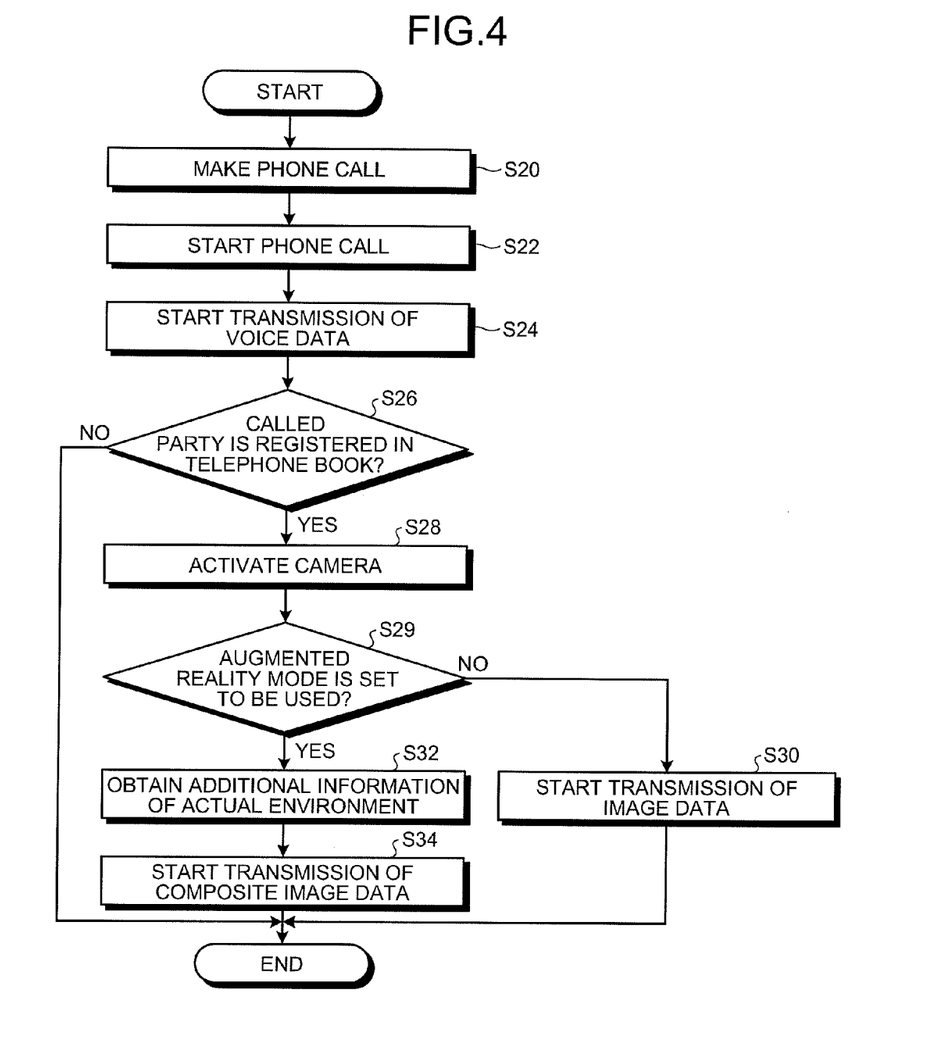
FIG. 4 is a flowchart explaining an operation of the mobile communication device.
Figure 5:
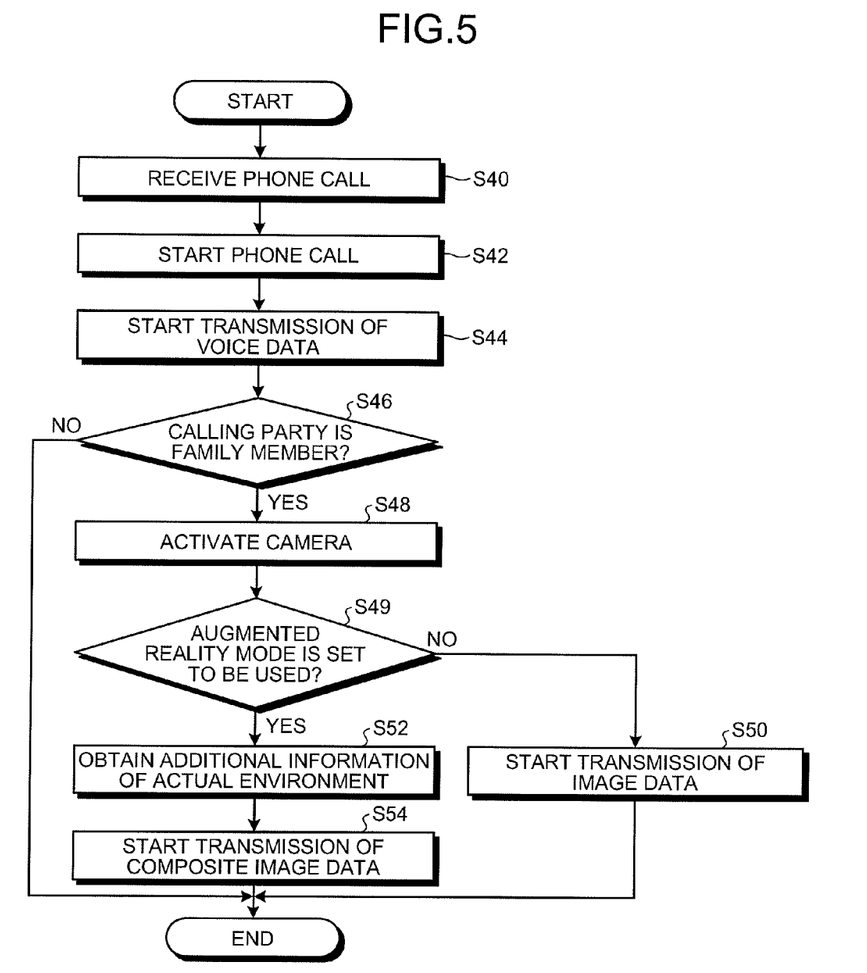
FIG. 5 is a flowchart explaining an operation of the mobile communication device.

Then, the telephone operation of the mobile communication device will be described using FIGS. 4 and 5. FIGS. 4 and 5 are flowcharts explaining the respective operations of the mobile communication device. When the other party is preliminarily assigned, the mobile communication device 1 activates the camera 40 upon starting communication, and then starts a phone call while transmitting an image (the image of the object), which is taken by the camera 40, to the other party.

First of all, a description will be given of a case where the mobile communication device 1 makes a phone call, that is, a case of calling using FIG. 4. In the example of FIG. 4, a condition that image data is transmitted in the case where the called party is registered in the address book (a telephone book) 44 is set to the condition table 46.

The control unit 22 of the mobile communication device 1 activates the communication control unit 22a in response to an input of a predetermined operation by an operator. Then, when a call key of the operating unit 13 is pressed in a state where any address information is specified, or a telephone number is input, the control unit 22 executes calling, that is, a calling processing at Step S20. Thus, the control unit 22 makes a phone call to the input. Then, the control unit 22 starts a phone call at Step S22 when a signal for communication from the called party is detected, that is, in the case where the called party answers.

The control unit 22 starts transmission of voice data at Step S24 when the phone call starts at Step S22. Specifically, the control unit 22 converts voice input at the microphone 15 into a signal in the sound processing unit 30, and then starts a processing to transmit the signal from the communication unit 26. In the case where the voice signal is transmitted from another communication device through the communication unit 26, the control unit 22 converts the voice signal in the sound processing unit 30, and then starts a processing to output the converted signal from the receiver 16. That is, the control unit 22 starts a phone call at Step S24.

The control unit 22 determines whether the calling destination is registered in the telephone book at Step S26 after the control unit 22 starts the transmission of the voice data at Step S24. That is, the control unit 22 determines whether the communication destination to which the control unit 22 called at Step S20, that is, the called party is registered in the address book 44. The control unit 22 reads out a condition from the condition table 46, thus being set. The control unit 22 compares a telephone number input to call and a telephone number registered in the address book 44. This allows the control unit 22 to determine whether or not the called party is registered in the address book 44. The telephone number input to call is preferred to be compared only in a portion of the telephone number that specifies the called party. That is, an additional number not to notify the telephone number such as 184 is not targeted for the comparison. This allows accurately comparing the called party with members registered in the address book 44.

In the case where the control unit 22 determines that the calling destination is not registered in the telephone book at Step S26 (No), that is, in the case where the control unit 22 determines that the called party is not registered in the address book 44, the control unit 22 terminates the processing. Accordingly, in this case, the control unit 22 communicates with voice call only.

In contrast, in the case where the control unit 22 determines that the calling destination is registered in the telephone book at Step S26 (Yes), that is, in the case where the control unit 22 determines that the called party is registered in the address book 44, the control unit 22 activates the camera 40 at Step S28. Specifically, the control unit 22 activates the camera 40 using the imaging control unit 22b.

The control unit 22 activates the camera 40 at Step S28 so as to obtain the image of the imaged area 41 and then determines whether the augmented reality mode is set to be used at Step S29. In the case where the control unit 22 determines that the augmented reality mode is not set to be used at Step S29 (No), that is, in the case where reality mode is set to be used, the control unit 22 starts transmission of the image data at Step S30. That is, the control unit 22 starts a processing to transmit the image, which is obtained by the camera 40, of the imaged area 41 to the called party as the image data. The control unit 22 terminates the processing after starting transmission of the image data at Step S30. Accordingly, in this case, the control unit 22 communicates with the called party to transmit the image data while performing voice call.

In the case where, the control unit 22 determines that the augmented reality mode is set to be used at Step S29 (Yes), the control unit 22 obtains additional information of actual environment at Step S32. That is, the control unit 22 obtains information corresponding to the image (actual surrounding environment) obtained by the camera 40 as the additional information. Specifically, the control unit 22 transmits the obtained image information to an external server through the communication unit 26. The external server analyzes the image to specify a building and a road in the image, an imaging location, or the like. When the building, the road in the image, or the imaging location are specified, the external server selects information corresponding to the building and the road, or information corresponding to the imaging location. Then, the external server transmits the information to the mobile communication device 1. The mobile communication device 1 obtains the information transmitted from the external server so as to obtain the additional information of the actual environment (the taken image).

Subsequently, the control unit 22 starts transmission of composite image data at Step S34 after obtaining the additional information at Step S32. Specifically, the control unit 22 combines the additional information obtained at Step S32 with the image data, and then starts transmission of the combined image. Thus, the control unit 22 communicates with the called party to transmit the image data with the additional information while performing voice call.

Then, a description will be given of a case where the mobile communication device 1 receives a phone call, that is, the incoming call using FIG. 5. In the example of FIG. 5, a condition that image data is transmitted in the case where the calling party is registered in a family group of the address book 44 is set in the condition table 46.

The control unit 22 of the mobile communication device 1 activates the communication control unit 22a when detecting a phone call, that is, the incoming call through the communication unit 26 at Step S40. The communication control unit 22a may be always activated. Then, the control unit 22 detects information of the calling party (the communication device calling) through the communication unit 26. The control unit 22 displays the information of the calling party on the display unit 32 based on the detection. At this time, in the case where the phone call is from the calling party corresponding to the address information registered in the address book 44, the control unit 22 displays information of the calling party, that is, a registered name as the information of the calling party. Then, the control unit 22 starts a phone call at Step S42 after detecting a signal for instructing a start of communication through the talk key and the like in the operating unit 13. The control unit 22 may start a phone call in the case where a set time has passed after the control unit 22 detects the incoming call.

The control unit 22 starts transmission of the voice data at Step S44 after starting the phone call at Step S42. That is, the control unit 22 starts a phone call at Step S44, similarly to Step S24.

The control unit 22 determines whether the calling party is a family member at Step S46 after starting the transmission of the voice data at Step S44. That is, the control unit 22 determines whether the origin of the incoming call at Step S40, that is, the calling party is registered in the family group of the address book 44. The control unit 22 reads out the condition from the condition table 46, thus being set.

In the case where the control unit 22 determines that the origin is not registered in the family group, that is, the calling party is not registered in the family group at Step S46 (No), the control unit 22 terminates the processing. Accordingly, in this case, the control unit 22 communicates with voice call only.

In contrast, in the case where the control unit 22 determines that the origin is registered in the family group, that is, the calling party is registered in the family group of the address book 44 at Step S46 (Yes), the control unit 22 activates the camera 40 at Step S48.

The control unit 22 activates the camera 40 to obtain the image of the imaged area 41 at Step S48, and then determines whether the augmented reality mode is set to be used at Step S49. In the case where the control unit 22 determine that the augmented reality mode is not set to be used, that is, the reality mode is set to be used at Step S49 (No), the control unit 22 starts transmission of the image data at Step S50. That is, the control unit 22 starts a processing to transmit the image, which is obtained by the camera 40, of the imaged area 41 to the calling party as the image data. The control unit 22 terminates the processing after starting transmission of the image data at Step S50. Accordingly, in this case, the control unit 22 communicates with the calling party to transmit the image data while performing voice call.

In the case where the control unit 22 determines that the augmented reality mode is set to be used at Step S49 (Yes), the control unit 22 obtains additional information of the actual environment at Step S52. That is, the control unit 22 obtains information corresponding to the image (actual surrounding environment) obtained by the camera 40 as the additional information. The method for obtaining the additional information is similar to that of Step S32.

Subsequently, the control unit 22 starts transmission of composite image data at Step S54 after obtaining the additional information at Step S52. Specifically, the control unit 22 combines the additional information obtained at Step S52 with the image data, and then starts transmission of the composite image. Thus, the control unit 22 communicates with the calling party to transmit the image data with the additional information while performing voice call.

As described above, in the case where the mobile communication device 1 starts the phone call with the preset party, the mobile communication device 1 activates the camera, takes the image of the imaged area, and then transmits the image information to the other party. Thus, the transmitted image is displayed on a display unit in a communication device of the other party. Consequently, the location and surroundings of the mobile communication device 1 is sent to the other party.

Thus, the mobile communication device 1 automatically transmits the image taken by the camera to the communication destination during a phone call with the preset party. This allows the user to transmit his/her location and surroundings to the other party without a special operation. That is, simply making a phone call allows the user who is not familiar with the mobile communication device 1 or unskilled to tell his/her surroundings to the other party. In the case where a child is lost or an aged person is wandering around, simply making a phone call allows the other party to immediately know his/her surroundings.

Also in the case where the mobile communication device 1 receives a phone call, that is, the incoming call from the preset party, and starts the phone call, the mobile communication device 1 automatically activates the camera and transmits the image data to the other party as described above. This allows a person who is a parent of the user of the mobile communication device 1 or looking for the user to know surroundings of the user by making a phone call to start the phone call. The caller obtains visual information that is difficult to understand by talking, thus accurately understanding the surroundings.

The mobile communication device 1 may automatically start a phone call in the case where the mobile communication device 1 receives an incoming call from the preset party. This allows obtaining an image near a user of the mobile communication device 1 even in the case where the user is not able to answer the telephone and to talk.

Transmitting an actual image of surrounding scenery allows the other party to accurately know the surroundings. That is, this transmits the surroundings more accurately than a case where a location is determined on a map like a case of using GPS (Global Positioning System) function. Transmitting an image of the surroundings allows the other party to specify the location if the other party knows the region. This allows the other party to obtain the surroundings that is difficult to understand on a map even if the other party does not know the region.

The mobile communication device 1 selects the augmented reality mode depending on the setting or the condition, and transmits the image (the composite image) with the additional information, thus appropriately notifying its surroundings. That is, the mobile communication device 1 uses the information (the information corresponding to its surroundings) corresponding to the image obtained by the camera 40 as the additional information, so as to combine the additional information with the image. Then, the mobile communication device 1 transmits the composite image to the communication destination, thus accurately notifying the communication destination of its surroundings. The mobile communication device 1 uses various kinds of information as the additional information. The additional information may employ, as described above, character information related to a location or image information corresponding to an image. Thus, with image information used as the additional information, for example, in the case where an image is dark and difficult to be recognized, the image that is taken at the same place in the daytime may be combined as the additional information.

In the above embodiment, the external server (the processing unit) analyzes the image to specify the surroundings (the building, the road, and the location); however, the present invention is not limited to this configuration. For example, the mobile communication device 1 may have a GPS function, and transmits location information of the mobile communication device 1 detected by the GPS function to the external server together with the image information. This allows the external server to specify the location of the image based on the transmitted location information, thus reducing load of the server to calculate the additional information. For example, the location information may be calculated based on not the GPS function but information of the base station in communication.

In the case where the mobile communication device 1 obtains information from the external server, the mobile communication device 1 may select needed information from the obtained information, and combine the selected information with an image. In the above embodiment, the external server once transfers information to the mobile communication device 1, and the mobile communication device 1 then transmits the image with the additional information to the other party; however, the configuration is not limited thereto. The mobile communication device 1 may be set such that the image with the additional information is directly transmitted from the external server to the communication device of the other party.

In the above embodiment, the additional information is obtained from the external server, which communicates with through the communication unit; however, the mobile communication device 1 may store the additional information to be selected and execute the processing inside the mobile communication device 1. In the case where the external server obtains the additional information, needed information is able to be selected from many pieces of additional information, thus ensuring a selection of more recognizable additional information. Executing a processing inside the mobile communication device 1 reduces volume of communication.

The mobile communication device 1 may be set to the reality mode, which directly transmits the image in communication, or the augmented reality mode, which adds the additional information to the image in communication, with various methods. For example, the mode may be set as needed by a user, or may preliminarily be set. The mode may be set based on an analysis result of the image. For example, the mode is set to the augmented reality mode in the case where the image is dark, and the mode is set to the reality mode in the case where the image is bright. The mode may be set by the other party.

The mobile communication device 1 arranges the imaging window of the camera 40 in a region that is not covered by the operator when making a phone call. That is, the mobile communication device 1 arranges the camera 40 in a position that allows taking an image of scenery or surroundings, which is other than the operator, during a phone call. This allows the mobile communication device 1 to take an image of its surroundings during the phone call with the camera 40, that is, while talking. In the case where the imaging window is covered by an operator's hand or hair, the mobile communication device 1 may notify of this situation where the imaging window is covered using voice, vibration, or the like.

Thus, the mobile communication device 1 is configured to take not an image of a user during a phone call, but an image of its surroundings during the phone call. This allows the mobile communication device 1 to take an image of scenery during the phone call. That is, in the case where the mobile communication device 1 has a configuration that makes a phone call while imaging a user like a television telephone, a camera, a receiver (a receiver unit), and a microphone are disposed in such locations that an image of the user is taken during a talk. Accordingly, when this mobile communication device 1 takes an image of surrounding scenery, the receiver and the microphone does not obtain voice or provide clear voice, or has difficulty in obtaining voice or providing clear voice. Thus, although it is difficult to take an image of the user during a talk, employing the configuration of the mobile communication device 1 allows the mobile communication device 1 to perform a talk (voice communication) while taking the image of surrounding scenery.

This allows the mobile communication device 1 to obtain the image without letting other people know that the image is being taken. That is, this allows the user to obtain an image of a stranger and notify the other party of the stranger while having the stranger think that the user is simply telephoning when the stranger is approaching.

As the above embodiment, the mobile communication device 1 is preferred to have the camera 40 on the face opposite to the face facing a user's face during a phone call, that is, the face where the receiver is disposed. Arranging the camera 40 in this location allows the mobile communication device 1 to appropriately take an image of surrounding scenery with high probability during a phone call.

The camera 40 is preferred to shift the imaged area. That is, directions and locations of the imaging window and/or the imaging device may be changed. This allows the imaged area to be shifted, thus taking an image of surrounding scenery more smoothly. Moreover, Shifting the imaged area allows taking an image of wider scenery.

The mobile communication device 1 may include a function (a GPS function or a function to specify a location using information from a base station) to detect a location. Then, the mobile communication device 1 may be configured to stop taking the image using a camera and/or transmission of the taken image in a predetermined region (area) even through a phone call is started. This reduces load during a phone call in a safety region such as user's home and a predetermined facility. This also prevents activation of the camera in a train where taking an image bothers other people. The mobile communication device 1 may include a function to detect its surroundings. Then, the mobile communication device 1 may be configured to stop taking an image using a camera and/or transmission of the taken image in the case where its surroundings (sound noise, a light amount and the like) are preliminarily set instead of the location information (region information). This ensures advantageous effects similar to those as described above.

The mobile communication device 1 may include a time measuring function to detect an elapsed time, and stop transmission of an image when a certain period of time has passed after start of communication. Thus, a period of transmission of the image is limited to a certain period of time, and therefore data amount that is transmitted and received during the communication is reduced. In the case where the other party was not able to specify the mobile communication device 1 using the image in the first certain period of time, the other party is able to call back again to obtain the image of the surroundings. A reference time at which measurement of an elapsed time is started may be a time other than a start time of the communication.

Figure 6:
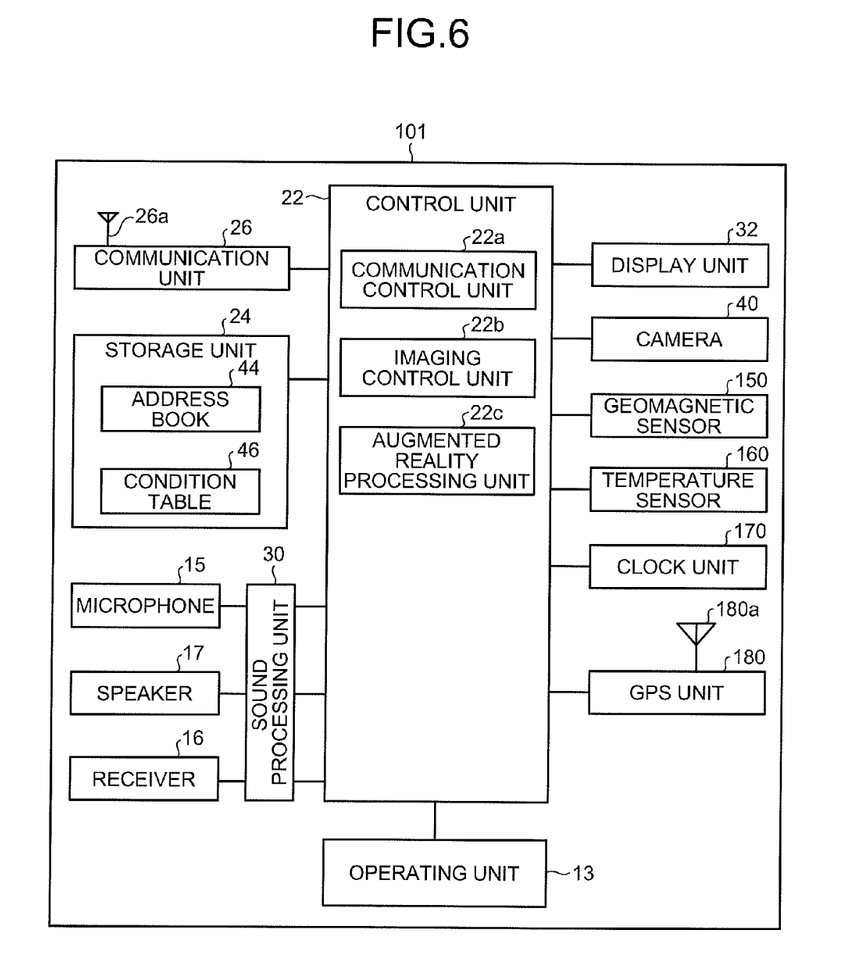
FIG. 6 is a block diagram illustrating a schematic functional configuration of a mobile communication device according to another embodiment.

Then, a description will be given of the mobile communication device according to another embodiment using FIG. 6. FIG. 6 is a block diagram illustrating a schematic functional configuration of the mobile communication device according to another embodiment. A mobile communication device 101 in FIG. 6 includes various functions as described above in addition to respective functions of the mobile communication device 1 in FIG. 3. The mobile communication device 101 includes the control unit 22, the storage unit 24, the communication unit 26, the operating unit 13, the sound processing unit 30, the display unit 32, the camera 40, a geomagnetic sensor 150, a temperature sensor 160, a clock unit 170, and a GPS unit 180. The control unit 22, the storage unit 24, the communication unit 26, the operating unit 13, the sound processing unit 30, the display unit 32, and the camera 40 in the mobile communication device 101 have similar configurations to those in the mobile communication device 1, and will not be further elaborated here.

The geomagnetic sensor 150 is a detector to detect a direction of terrestrial magnetism in three mutually perpendicular directions. The detector to detect the terrestrial magnetism employs a Hall element, an MR element, an MI element, flux-gate element, or the like. The geomagnetic sensor 150 transmits the detection result of the terrestrial magnetism in the three directions to the control unit 22. The control unit 22 detects a direction (orientation) of the mobile communication device 101 based on the detection result of the geomagnetic sensor 150. The control unit 22 detects an attitude of the mobile communication device 101 based on the detection result of the geomagnetic sensor 150, thus obtaining a direction (orientation information) of the image taken by the camera 40. Thus, the geomagnetic sensor 150 may be used as an orientation information acquiring unit that obtains the orientation information related to the image (image information) taken by the camera 40. The information related to the image is not limited to the direction of the image.

The temperature sensor 160 is a detector to obtain ambient temperature of the device. The clock unit 170 is a unit to achieve a clock function as described above. The clock unit 170 obtains a current time through the communication unit 26 and the like. The temperature sensor 160 and the clock unit 170 transmit the obtained information to the control unit 22.

The GPS unit 180 is a location information acquiring unit that achieves a function to detect a location as described above. The GPS unit 180 includes a GPS antenna 180*a* that receives radio waves output from a plurality of GPS satellites. The GPS antenna 180*a* obtains location information of the mobile communication device 101 based on received information of radio waves, which are output from the plurality of GPS satellites. The GPS unit 180 transmits the obtained location information to the control unit 22.

The control unit 22 has a function to integrally control the whole operation of the mobile communication device 101, similarly to the control unit 22 of the mobile communication device 1 as described above. That is, the control unit 22 controls operations of the communication unit 26, the sound processing unit 30, display unit 32, the geomagnetic sensor 150, the temperature sensor 160, the clock unit 170, and the GPS unit 180. The control unit 22 controls these such that various processings of the mobile communication device 101 are executed in an appropriate procedure corresponding to an operation through the operating unit 13 and software stored in the storage unit 24 of the mobile communication device 101.

The augmented reality processing unit 22c selects additional information corresponding to the image based on the image obtained by the camera 40, and adds the selected additional information to the image. The augmented reality processing unit 22c adds information detected by each of the geomagnetic sensor 150, the temperature sensor 160, the clock unit 170, and the GPS unit 180 as the additional information. For example, in the case where the augmented reality processing unit 22c selects orientation information as the additional information corresponding to an image based on the image obtained by the camera 40, the augmented reality processing unit 22c uses the geomagnetic sensor 150 so as to detect the orientation information, for example, orientation of the taken image, and then adds the detected orientation information to the image. The augmented reality processing unit 22c may be configured to add the orientation information as the additional information in the case where the augmented reality mode is selected by the user, and not to add the addition of the orientation information as the additional information in the case where the reality mode is selected. Selection of the modes may be set by user using various operations.

Thus, the mobile communication device 101 uses the orientation information obtained by the geomagnetic sensor 150 as the additional information regarding the image information. This allows notifying the information of the direction where the image was taken and orientation corresponding to the image.

In the above description, a case where the information obtained by the geomagnetic sensor 150 is employed as the additional information is described; however, information obtained by each of the temperature sensor 160, the clock unit 170, and the GPS unit 180 may be similarly employed as the additional information. In the case where the mobile communication device 101 uses temperature information obtained from the temperature sensor 160 as the additional information regarding the image information, ambient temperature environment can be notified.

In the case where the mobile communication device 101 uses time information obtained by the clock unit 170 as the additional information regarding the image information, the communication destination may estimate the current condition at transmission side event if the image information is not indicative of the current image. In this case, a message may be added to indicate that the image information is not indicative of the current image.

In the case where the mobile communication device 101 uses GPS information (pieces of location information such as latitude, longitude, altitude), which is obtained by the GPS unit 180, as the additional information regarding the image information, the other party can be notified of an accurate location of the transmission side itself. In the above embodiment, the mobile communication device 101 including four functions of the geomagnetic sensor 150, the temperature sensor 160, the clock unit 170, and the GPS unit 180 as various functions is described; however, there is not a need to include all of the four functions. Any configuration is possible insofar as the mobile communication device 101 includes a needed function corresponding to information used as the additional information.

Figure 7:
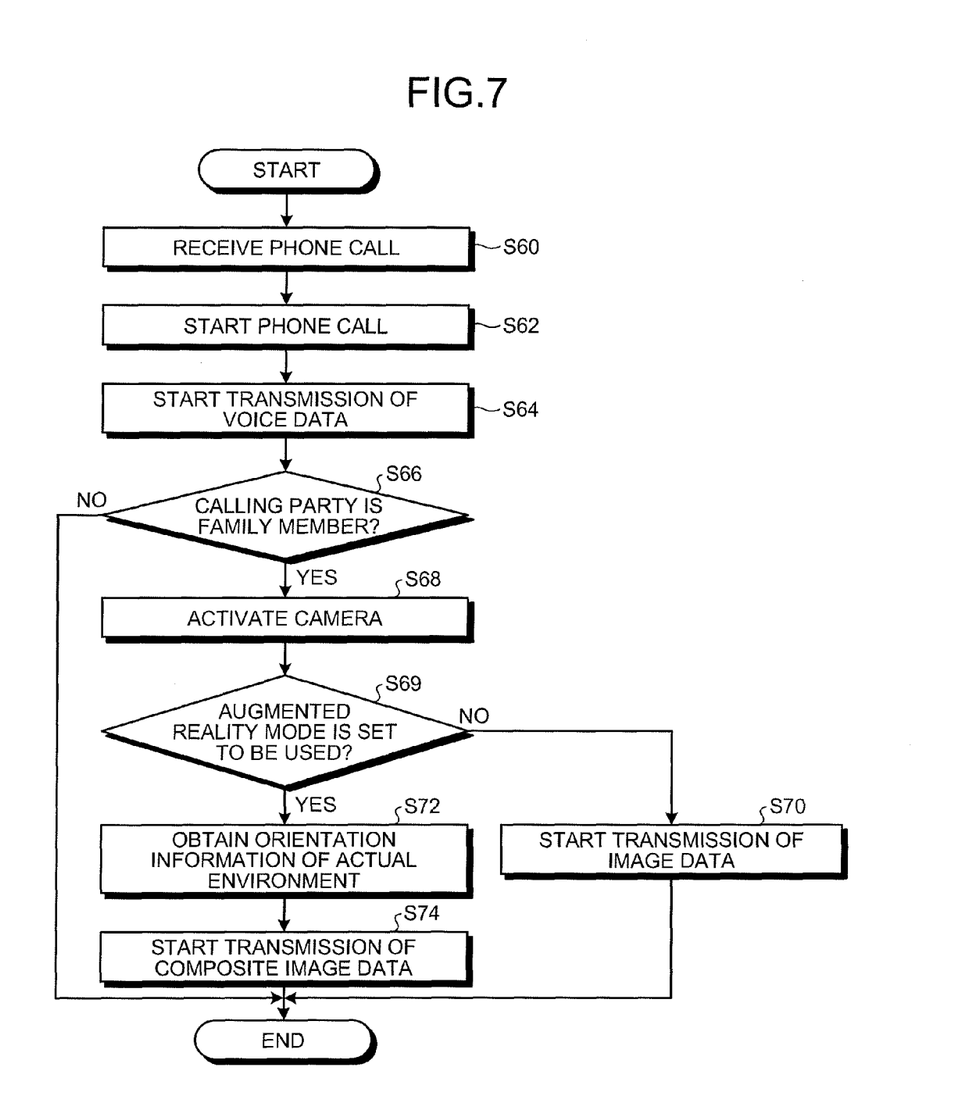
FIG. 7 is a flowchart explaining an operation of the mobile communication device.

Then, a description will be given of a case where the mobile communication device 101 receives a phone call, that is, the incoming using FIG. 7. In the example of FIG. 7, a condition that image data is transmitted in the case where the calling party is registered in a family group of the address book 44 is set in the condition table 46. Further, in the example of FIG. 7, the orientation information is used as the additional information. The mobile communication device 101 may achieve the processing to make a phone call by combining the above-described processing in FIG. 4 with a processing of the additional information in FIG. 7.

The control unit 22 of the mobile communication device 101 activates the communication control unit 22a when detecting a phone call, that is, the incoming call through the communication unit 26 at Step S60. The communication control unit 22a may be always activated. Then, the control unit 22 detects information of the calling party (the communication device calling) through the communication unit 26. The control unit 22 displays the information of the calling party on the display unit 32 based on the detection. At this time, in the case where the phone call is from the calling party corresponding to the address information registered in the address book 44, the control unit 22 displays information of the calling party, that is, a registered name as the information of the called party. Then, the control unit 22 starts a phone call at Step S62 after detecting a signal for instructing a start of communication through the talk key and the like in the operating unit 13. The control unit 22 may start a phone call in the case where a set time has passed after the control unit 22 detects the incoming call.

The control unit 22 starts transmission of the voice data at Step S64 after starting the phone call at Step S62. That is, the control unit 22 starts a phone call at Step S64, similarly to Step S44.

The control unit 22 determines whether the calling party is a family member at Step S66 after starting the transmission of the voice data at Step S64. That is, the control unit 22 determines whether the origin of the incoming call at Step S60, that is, the calling party is registered in the family group of the address book 44. The control unit 22 reads out a condition from the condition table 46, thus being set.

In the case where the control unit 22 determines that the origin is not registered in the family group, that is, the calling party is not registered in the family group at Step S66 (No), the control unit 22 terminates the processing. Accordingly, in this case, the control unit 22 communicates using voice call only.

In contrast, in the case where the control unit 22 determines that the origin is registered in the family group, that is, the calling party is registered in the family group of the address book 44 at Step S66 (Yes), the control unit 22 activates the camera 40 at Step S68.

The control unit 22 activates the camera 40 to obtain the image of the imaged area 41 at Step S68, and then determines whether the augmented reality mode is set to be used at Step S69. In the case where the control unit 22 determines that the augmented reality mode is not set to be used, that is, the reality mode is set to be used at Step S69 (No), the control unit 22 starts transmission of the image data at Step S70. That is, the control unit 22 starts a processing to transmit the image, which is obtained by the camera 40, of the imaged area 41 to the calling party as the image data. The control unit 22 terminates the processing after starting transmission of the image data at Step S70. Accordingly, in this case, the control unit 22 communicates with the calling party to transmit the image data while performing voice call.

In the case where the control unit 22 determines that the augmented reality mode is set to be used at Step S69 (Yes), the control unit 22 obtains the orientation information of actual environment at Step S72. That is, the control unit 22 obtains the orientation information as the additional information corresponding to the image (actual surrounding environment) obtained by the camera 40. As described above, the orientation information may be obtained using orientation detection by the geomagnetic sensor 150.

Subsequently, the control unit 22 starts transmission of the composite image data at Step S74 after obtaining the orientation information at Step S72. Specifically, the control unit 22 combines the orientation information obtained at Step S72 as the additional information with the image data, and then starts transmission of the composite image. Thus, the control unit 22 communicates with the calling party to transmit the image data with the additional orientation information while performing voice call.

As described above, the mobile communication device 101 is configured to add various pieces of information as the additional information.

The mobile communication devices 1 and 101 may control to stop and resume the transmission of the taken image based on sound information such as push tone received from the communication device of the other party. Thus, controlling by the communication device of the other party allows the other party to obtain an accurate image of surroundings in the case where the user of the mobile communication device 1 or 101 is unskilled.

The mobile communication devices 1 and 101 do not limit the other party, that is, the communication device set as a transmission destination of the image to be the mobile communication device. Then, a fixed communication device may be targeted for the transmission. The mobile communication device 1 may be configured to transmit an image taken by the camera when making a phone call to a security company, the police, the fire department, or the like regardless of the setting of the address book or as a unique setting of the address book. This provides more information to organizations with high possibility of emergency call so as to smoothly rescue people, for example.

The mobile communication device may further include a GPS function as described above. Including the GPS function in addition to the function of the camera allows the other party to surely and accurately know the location of the user.

The image to be transmitted to the other party during the phone call may be a moving image or a still image. If the respective images have the same pixel numbers, transmitting still images reduces data volume. Thus, load of the communication is reduced. On the other hand, transmitting a moving image comprehensibly coveys surrounding situation to the other party.

INDUSTRIAL APPLICABILITY

As described above, the mobile communication device according to the present invention is appropriate for applying to a mobile communication device including an imaging function and a communication function.

The invention claimed is:

1. A mobile communication device, comprising:
an operating unit for receiving an operation;
an imaging unit for taking an image;
a communication unit for communicating with a second communication device; and
a control unit configured to communicate with the second communication device through the communication unit,
wherein the control unit is configured to, upon starting communication with the second communication device that is associated with a predetermined group,
start taking an image by the imaging unit, and
transmit the image to the second communication device through the communication unit either in a first mode in which the image is not processed in a predetermined manner or in a second mode in which the image is processed in the predetermined manner,
wherein
the first mode corresponds to an augmented reality mode not being set,
the second mode corresponds to the augmented reality mode being set,
the mobile communication device further comprises an orientation information acquiring unit for acquiring orientation information related to the image,
the control unit is configured to add additional information to the image in the second mode,
the additional information corresponding to the image comprises the orientation information related to the image and acquired by the orientation information acquiring unit, and
the control unit is configured not to take the image by the imaging unit or not to transmit the image, when the control unit detects a preliminarily set signal in signals supplied from the second communication device during said communication with the second communication device.

2. The mobile communication device according to claim 1, further comprising
a location information acquiring unit for acquiring location information of the mobile communication device,
wherein
the additional information comprises the location information.

3. The mobile communication device according to claim 1, wherein
the control unit is configured to acquire the additional information through the communication unit in the second mode.

4. The mobile communication device according to claim 1, wherein,
in the second mode,
the control unit is configured to
transmit the image to a third communication device for processing the image, and
transmit the processed image to the second communication device through the third communication device.

5. The mobile communication device according to claim 1, wherein
the control unit is configured to start transmitting the image in a case where the control unit starts said communication with the second communication device in response to a communication start request from the second communication device.

6. The mobile communication device according to claim 1, further comprising
a location detection unit for detecting a location of the mobile communication device, wherein
the control unit is configured not to take the image by the imaging unit or not to transmit the image, in a case where the location detected by the location detection unit is within a set region.

7. The mobile communication device according to claim 1, further comprising
a time measurement unit for detecting an elapsed time after a reference time, wherein
the control unit is configured not to take the image by the imaging unit or not to transmit the image, in a case where the elapsed time exceeds a predetermined time.

8. The mobile communication device according to claim 1, further comprising
a receiver unit, wherein
the imaging unit is disposed on an opposite face of a face on which the receiver unit is disposed.

9. The mobile communication device according to claim 1, wherein
the control unit is configured to transmit the image acquired by the imaging unit to a fourth communication device including a function for detecting location information from the image to obtain the additional information.

10. A mobile communication device, comprising:
an operating unit for receiving an operation;
an imaging unit for taking an image;
a communication unit for communicating with a second communication device; and
a control unit configured to communicate with the second communication device through the communication unit,
wherein the control unit is configured to, upon receiving a phone call from the second communication device that is associated with a predetermined group,
start taking an image by the imaging unit, and
transmit the image to the second communication device through the communication unit either in a first mode in which the image is not processed in a predetermined manner or in a second mode in which the image is processed in the predetermined manner,
wherein
the first mode corresponds to an augmented reality mode not being set,
the second mode corresponds to the augmented reality mode being set,
the mobile communication device further comprises an orientation information acquiring unit for acquiring orientation information related to the image,
the control unit is configured to add additional information to the image in the second mode,
the additional information corresponding to the image comprises the orientation information related to the image and acquired by the orientation information acquiring unit, and
the control unit is configured not to take the image by the imaging unit or not to transmit the image, when the control unit detects a preliminarily set signal in signals supplied from the second communication device during said communication with the second communication device.

11. A mobile communication device, comprising:
an operating unit for receiving an operation;
an imaging unit for taking an image;
a communication unit for communicating with a second communication device; and
a control unit configured to communicate with the second communication device through the communication unit,
wherein the control unit is configured to, upon starting communication with the second communication device that is associated with a predetermined group,
start taking an image by the imaging unit when
an incoming call from the second communication device is detected and
then a set period of time has elapsed without detecting any operation with respect to the incoming call, and
transmit the image to the second communication device through the communication unit either in a first mode in which the image is not processed in a predetermined manner or in a second mode in which the image is processed in the predetermined manner,
wherein
the first mode corresponds to an augmented reality mode not being set,
the second mode corresponds to the augmented reality mode being set,
the mobile communication device further comprises an orientation information acquiring unit for acquiring orientation information related to the image,
the control unit is configured to add additional information to the image in the second mode,
the additional information corresponding to the image comprises the orientation information related to the image and acquired by the orientation information acquiring unit, and
the control unit is configured not to take the image by the imaging unit or not to transmit the image, when the control unit detects a preliminarily set signal in signals supplied from the second communication device during said communication with the second communication device.

* * * * *